(12) United States Patent
Zhang et al.

(10) Patent No.: US 11,733,134 B2
(45) Date of Patent: Aug. 22, 2023

(54) SAMPLE PREPARATION MOULD AND SAMPLE PREPARATION METHOD FOR TRIAXIAL TEST OF MUNICIPAL SOLID WASTE

(71) Applicant: Zhejiang Sci-Tech University, Zhejiang (CN)

(72) Inventors: Zhenying Zhang, Zhejiang (CN); Guoyang Fan, Zhejiang (CN); Jiayue Zhang, Zhejiang (CN); Jiahe Zhang, Zhejiang (CN); Qiaona Wang, Zhejiang (CN); Bang Wang, Zhejiang (CN); Min Wang, Zhejiang (CN)

(73) Assignee: Zhejiang Sci-Tech University, Zhejiang (CN)

( * ) Notice: Subject to any disclaimer, the term of this patent is extended or adjusted under 35 U.S.C. 154(b) by 350 days.

(21) Appl. No.: 17/180,857

(22) Filed: Feb. 21, 2021

(65) Prior Publication Data

US 2021/0172842 A1    Jun. 10, 2021

(30) Foreign Application Priority Data

Jul. 22, 2020  (CN) .......................... 202010710199.2

(51) Int. Cl.
*G01N 1/36* (2006.01)
*G01N 1/28* (2006.01)

(52) U.S. Cl.
CPC .............. *G01N 1/36* (2013.01); *G01N 1/286* (2013.01); *G01N 2001/366* (2013.01)

(58) Field of Classification Search
CPC .... G01N 1/36; G01N 1/286; G01N 2001/366; G01N 2203/0256
USPC ......... 73/785, 788–790, 794, 795, 797, 798, 73/818, 821, 825, 841, 847, 856; 249/DIG. 4; 264/40.1
See application file for complete search history.

(56) References Cited

FOREIGN PATENT DOCUMENTS

| CN | 105842032 B | * | 3/2019 | ............ G01N 1/286 |
| CN | 209979330 U | * | 1/2020 | |

* cited by examiner

*Primary Examiner* — Robert R Raevis

(57) ABSTRACT

A sample preparation mould and a sample preparation method for the triaxial test of MSW are provided. In the present invention, the cylindrical main mould comprises two curved steel pieces, and the two sides of each curved steel piece have a stretched connection part; the two curved steel pieces are connected with each other and clamped by two steel clamps; porous stones are arranged at two ends of the cylindrical main mould and fixed separately by a top limiting lantern ring and a bottom lantern ring; the top limiting lantern ring is detachably connected to the top hopper, from which MSW materials are input; the cylindrical main mould is radially constrained in four positions, and the two ends thereof are axially constrained, thereby significantly improving stability during compacting and hence ensuring the axial and radial sizes of the MSW sample.

3 Claims, 2 Drawing Sheets

SAMPLE PREPARATION MOULD AND SAMPLE PREPARATION METHOD FOR TRIAXIAL TEST OF MUNICIPAL SOLID WASTE

CROSS REFERENCE OF RELATED APPLICATION

The application claims priority under 35 U.S.C. 119(a-d) to CN 202010710199.2, filed Jul. 22, 2020.

BACKGROUND OF THE PRESENT INVENTION

Field of Invention

The present invention is associated with the technical field of soil test, and more particularly to a sample preparation mould and sample preparation method for the triaxial test of municipal solid waste (MSW).

Description of Related Arts

Owing to the rapid economic development of China, the urbanization level has improved continuously, the urban population increased significantly, the quality of life improved, and the output of municipal solid waste (MSW) increased progressively each year. Currently, landfilling is an effective and typical treatment method at home and abroad. Existing MSW landfill sites are affected by problems such as difficult site selection and lack of landfill space. Furthermore, waste siege has become more evident in some areas, resulting in significant challenges to urban design and environmental governance. The mechanical property of waste is vital to the construction of landfill sites. For a specific landfill site, it is difficult to select the appropriate shear strength parameters, and the triaxial test is a good test method. To ensure the accuracy of test data, a complete MSW sample must be obtained. Currently, the sample preparation mould and the sample preparation method for the triaxial test of MSW are not available.

Conventional sample preparation methods for the triaxial test generally involve soil sample preparation. However, the composition of MSW is complex. MSW is a highly inhomogeneous material and contains a large amount of organic matter. When the test material is MSW, the conventional mould for the triaxial test typically presents three problems. First, in the conventional mould for preparing soil samples in the laboratory, three fan-shaped pieces constitute a hollow cylinder. However, MSW is different from the general soil. When filling MSW into the hollow cylinder, the sample spills out easily owing to human operational factors, causing the decreased amount of filled MSW. Second, after completing the sample preparation, the MSW must be retained for a significant amount of time. During this process, owing to its viscosity, the MSW is typically adsorbed on the inner surface of the mould. When striping the conventional three-piece mould, the soil generally sustains the instantaneous radial force, which will affect the mould disassembly and damage the sample, resulting in an incomplete sample. Third, the lateral displacement of the conventional three-piece mould is generally limited by a steel ring. During sample preparation, the steel ring moves easily owing to the effect of compacting, which will affect the sample preparation. The problems above result in many uncertain factors to the triaxial test of MSW.

SUMMARY OF THE PRESENT INVENTION

To overcome the deficiencies in prior arts, a sample preparation mould and a sample preparation method are proposed in the present invention for a triaxial test of municipal solid waste (MSW) to avoid loss of MSW materials when loading a sample, thereby effectively avoiding damages to the sample when disassembling the mould, as well as limiting radial and axial displacements.

The sample preparation mould for the triaxial test of MSW comprises a top hopper, a top limiting lantern ring, four screws, two porous stones, a cylindrical main mould, two steel clamps, and a bottom lantern ring, wherein: the cylindrical main mould comprises two curved steel pieces, and two sides of each curved steel piece have a stretched connection part; the connection parts are integrated with each curved steel piece; for one curved steel piece, the connection parts are located at upper parts of the two sides of the curved steel piece; for the other curved steel piece, the connection parts are located at lower parts of the two sides of the curved steel piece; the two curved steel pieces are connected with each other; two caps are integrated on an outer wall of each curved steel piece, and the two caps uniformly partition the curved steel piece into three sections along an axial direction; one steel clamp is arranged on every two caps, which are axially symmetrical on the two curved steel pieces; each steel clamp is fixed through bolts; center holes of the top limiting lantern ring and the bottom lantern ring comprise both a small-diameter section and a large-diameter section; for the bottom lantern ring, the small-diameter section is below the large-diameter section; a first porous stone is arranged in the large-diameter section of the bottom lantern ring; the first porous stone fits the large-diameter section of the bottom lantern ring in a clearance fit; a bottom end of the cylindrical main mould is embedded into the large-diameter section of the bottom lantern ring and arranged on the first porous stone; an outer wall of the bottom end of the cylindrical main mould fits the large-diameter section of the bottom lantern ring in a clearance fit; a second porous stone is arranged on a top end of the cylindrical main mould; for the top limiting lantern ring, the large-diameter section is below the small-diameter section; the top end of the cylindrical main mould is embedded into the large-diameter section of the top limiting lantern ring; both of an outer wall of the top end of the cylindrical main mould and the second porous stone on the top end of the cylindrical main mould fit the large-diameter section of the top limiting lantern ring in a clearance fit; the bottom lantern ring is fixed with the four screws that are uniformly distributed along a circumferential direction; four locating slots are provided on the top limiting lantern ring and uniformly distributed along a circumferential direction; a top end of each screw passes through one locating slot and is connected to a nut; the top limiting lantern ring presses the second porous stone on the top end of the cylindrical main mould; a damping ring is arranged between the top limiting lantern ring and each nut; a locating ring is integrated on a top surface of the top limiting lantern ring at an outside edge of the center hole and coaxially arranged; a locating slot that matches with the locating ring is provided at a bottom end face of the top hopper.

Each steel clamp comprises two semi-circular steel pieces, wherein: through-holes are provided at two ends of a first semi-circular steel piece; threaded holes are provided at two ends of a second semi-circular steel piece; one threaded hole and one through-hole, at the same end of the two semi-circular steel pieces, are connected through one bolt; and a damping ring is arranged between a head of each bolt and the opposite semi-circular steel piece.

The sample preparation method for the triaxial test of MSW using the sample preparation mould comprises steps of:

(1) screwing off the nut on each screw, removing the damping ring on each screw, and removing the top limiting lantern ring and the second porous stone on the top end of the cylindrical main mould;

(2) placing the bottom lantern ring on level ground, verifying the bolts on the two steel clamps to ensure that the bolts are screwed down, and verifying top end faces of the two curved steel pieces to ensure that the top end faces of the two curved steel pieces are aligned;

(3) sleeving the large-diameter section of the top limiting lantern ring outside the cylindrical main mould, matching the four locating slots of the top limiting lantern ring with the corresponding screws, arranging the damping ring on each of the four screws, and screwing down each nut;

(4) matching the locating slot of the top hopper with the locating ring of the top limiting lantern ring, filling the cylindrical main mould with a MSW sample layer by layer through the top hopper, and compacting each layer;

(5) after filling and compacting are completed, removing the top hopper, screwing off the nut on each screw, and removing the damping ring on each screw; subsequently, removing the top limiting lantern ring, and arranging the second porous stone on the top end of the cylindrical main mould; repeating the step (3); finally, retaining the MSW sample;

(6) after retaining the MSW sample for a specified duration, screwing off the nut on each screw and removing the damping ring on each screw; subsequently, removing the top limiting lantern ring and removing the cylindrical main mould with the MSW sample and the two porous stones from the bottom lantern ring; swinging the two porous stones at the two ends of the cylindrical main mould back and forth around a central axis several times and then removing the two porous stones while preventing the MSW sample from being taken away by the porous stones; screwing off the bolts on the two steel clamps and removing the two steel clamps; finally, removing the two curved steel pieces toward the two ends of the cylindrical main mould, thereby completing preparation of the MSW sample.

The present invention affords the following benefits:

First, using the present invention, the MSW sample can be filled and compacted conveniently through the top hopper while preventing the spillage of the MSW sample due to human factors; moreover, because the top hopper is detachably connected to the top limiting lantern ring, after filling and compacting are completed, the top hopper can be removed conveniently.

Second, using the present invention, four positions of the cylindrical main mould are radially limited through the steel clamps, top limiting lantern ring, and bottom lantern ring, and the four positions are uniformly distributed along the axis of the cylindrical main mould, thereby effectively limiting the radial displacement of the cylindrical main mould; moreover, the two porous stones at the two ends of the cylindrical main mould axially limit the two ends of the cylindrical main mould respectively under the effects of the top limiting lantern ring and bottom lantern ring, thereby effectively limiting the axial displacement of the cylindrical main mould; furthermore, the porous stone at the bottom end ensures the air permeability of the MSW sample and avoids the generation of negative pressure; hence, the present invention significantly improves the stability of the cylindrical main mould during compacting, thereby ensuring the axial and radial sizes of the MSW sample.

Third, using the present invention, when removing the two porous stones at the two ends of the cylindrical main mould, the porous stones are swung back and forth around the central axis several times to prevent the MSW sample from being taken away by the porous stones.

Fourth, using the present invention, the cylindrical main mould comprises two curved steel pieces that are connected with each other, and the two sides of each curved steel piece comprise a stretched connection part; when disassembling the mould, the cylindrical main mould is disassembled by splitting along the two ends; subsequently, the MSW sample is removed to ensure the complete preparation of the MSW sample.

Fifth, the sample preparation mould and method for the triaxial test of MSW, provided by the present invention, are applicable to engineering practices as well as to the tests of other soils.

DETAILED DESCRIPTION OF THE PREFERRED EMBODIMENT

The present invention is further illustrated with the accompanying drawings as follows.

Figure 1:
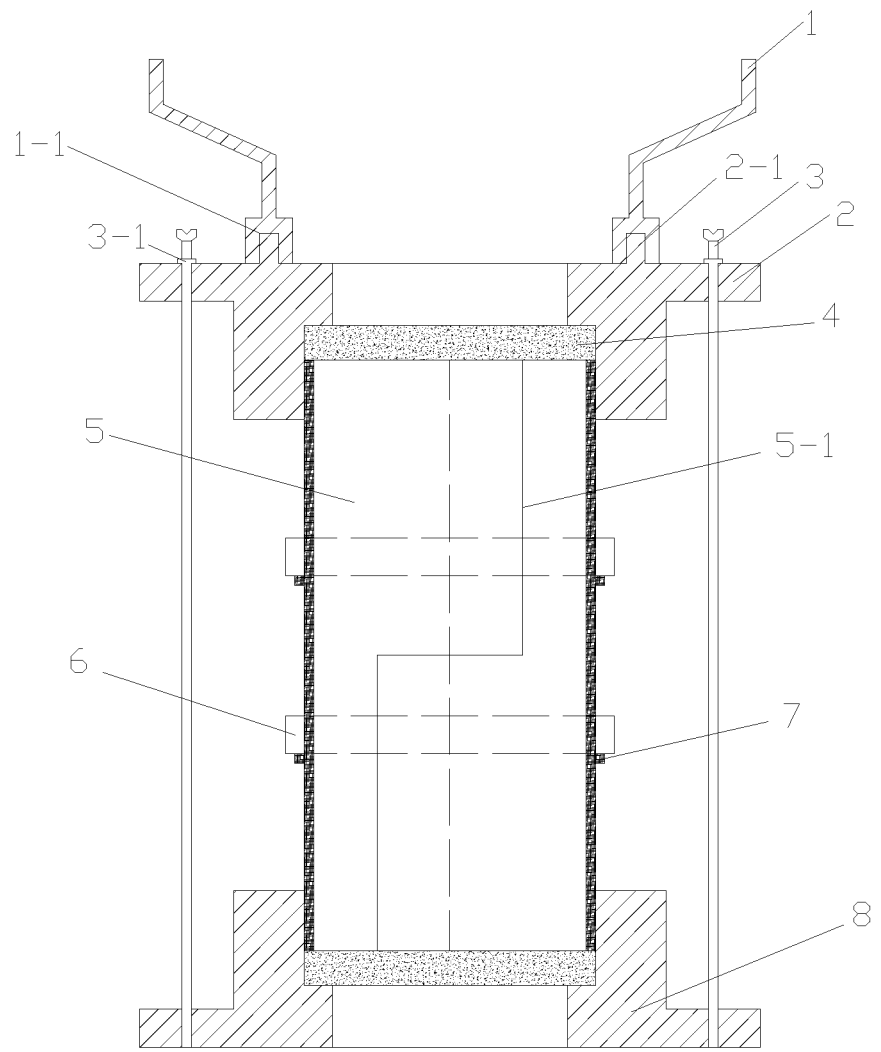
FIG. 1 shows an overall structural sketch of a sample preparation mould for a triaxial test of municipal solid waste (MSW) based on a preferred embodiment of the present invention.
Figure 2:
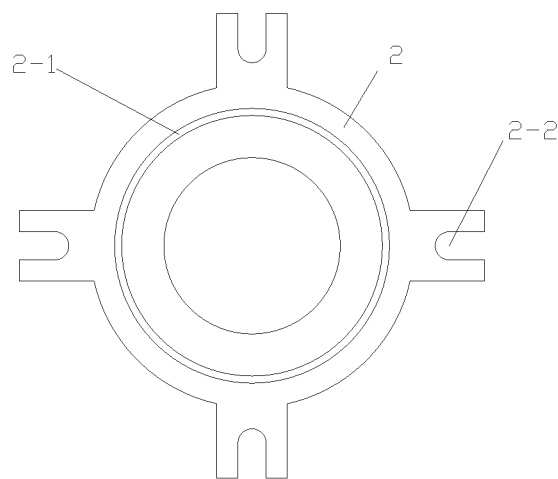
FIG. 2 shows a structural sketch of a top limiting lantern ring based on the preferred embodiment of the present invention.
Figure 3:
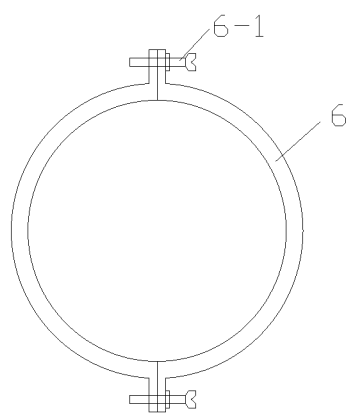
FIG. 3 shows a structural sketch of a steel clamp based on the preferred embodiment of the present invention.

As shown in FIGS. 1-3, based on the preferred embodiment of the present invention, a sample preparation mould for a triaxial test of municipal solid waste (MSW) comprises a top hopper 1, a top limiting lantern ring 2, four screws 3, two porous stones 4, a cylindrical main mould, two steel clamps 6, and a bottom lantern ring 8, wherein: the cylindrical main mould comprises two curved steel pieces 5, and two sides of each curved steel piece have a stretched connection part 5-1; the connection parts 5-1 are integrated with each curved steel piece 5; for one curved steel piece 5, the connection parts are located at upper parts of the two sides of the curved steel piece 5; for the other curved steel piece 5, the connection parts are located at lower parts of the two sides of the curved steel piece 5; the two curved steel pieces 5 are connected with each other; two caps 7 are integrated on an outer wall of each curved steel piece 5, and the two caps 7 uniformly partition the curved steel piece 5 into three sections along the axial direction; one steel clamp 6 is arranged on every two caps 7, which are axially symmetrical on the two curved steel pieces 5; each steel clamp 6 is fixed through bolts 6-1; the two steel clamps 6 are for limiting the radial displacements of two positions of the cylindrical main mould; center holes of the top limiting lantern ring 2 and bottom lantern ring 8 comprise a small-diameter section and a large-diameter section; for the bottom lantern ring 8, the small-diameter section is below the large-diameter section; a first porous stone 4 is arranged in the large-diameter section of the bottom lantern ring 8; the first porous stone 4 fits the large-diameter section of the bottom lantern ring 8 in a clearance fit; the first porous stone 4 ensures the air permeability of the MSW sample and avoids the generation of a negative pressure; a bottom end of the cylindrical main mould is embedded into the large-diameter section of the bottom lantern ring 8 and arranged on the first porous stone 4; an outer wall of the bottom end of the cylindrical main mould fits the large-diameter section of the bottom lantern ring 8 in a clearance fit; the large-diameter section of the bottom lantern ring 8 limits the radial displacement of the bottom end of the cylindrical main mould; the first porous stone 4 in the large-diameter section of the bottom lantern ring 8 limits the axial displacement of the bottom end of the cylindrical main mould; a second porous stone 4 is arranged on a top end of the cylindrical main mould; the second porous stone 4 is for compacting the MSW sample; for the top limiting lantern ring 2, the large-diameter section is below the small-diameter section; the top end of the cylindrical main mould is embedded into the large-diameter section of the top limiting lantern ring 2; both of an outer wall of the top end of the cylindrical main mould and the second porous stone on the top end of the cylindrical main mould fit the large-diameter section of the top limiting lantern ring 2 in a clearance fit; the large-diameter section of the top limiting lantern ring 2 limits the radial displacement of the top end of the cylindrical main mould; the bottom lantern ring 8 is fixed with the four screws 3, which are uniformly distributed along the circumferential direction; four locating slots 2-2 are provided on the top limiting lantern ring 2 and uniformly distributed along the circumferential direction; a top end of each screw 3 passes through one locating slot 2-2 and is connected to a nut for fixing the top limiting lantern ring 2 such that the second porous stone 4 on the top end of the cylindrical main mould can limit the axial displacement of the top end of the cylindrical main mould; a damping ring 3-1 is arranged between the top limiting lantern ring 2 and each nut; each damping ring 3-1 is made of rubber; the cylindrical main mould is radially constrained in four positions to ensure that a radial displacement will not occur during compacting; both the top and bottom ends of the cylindrical main mould are axially constrained to ensure that an axial displacement will not occur during compacting; a locating ring 2-1 is integrated on a top surface of the top limiting lantern ring 2 at an outside edge of the center hole and coaxially arranged; and a locating slot 1-1 that matches with the locating ring 2-1 is provided at a bottom end face of the top hopper 1.

As shown in FIG. 3, each steel clamp 6 comprises two semi-circular steel pieces, wherein: through-holes are provided at two ends of a first semi-circular steel piece; threaded holes are provided at two ends of a second semi-circular steel piece; one threaded hole and one through-hole at the same end of the two semi-circular steel pieces are connected through one bolt, and a damping ring is arranged between a head of each bolt and the opposite semi-circular steel piece.

A sample preparation method for the triaxial test of MSW using the sample preparation mold comprises steps of:

(1) screwing off the nut on each screw 3, removing the damping ring on each screw 3, and then removing the top limiting lantern ring 2 and the second porous stone 4 on the top end of the cylindrical main mould;

(2) placing the bottom lantern ring 8 on level ground, verifying the bolts on the two steel clamps 6 to ensure that the bolts are screwed down, and verifying top end faces of the two curved steel pieces 5 to ensure that the top end faces of the two curved steel pieces 5 are aligned;

(3) sleeving the large-diameter section of the top limiting lantern ring 2 outside the cylindrical main mould, matching the four locating slots 2-2 of the top limiting lantern ring 2 with the corresponding screws 3, arranging the damping ring on each of the four screws 3, and then screwing down each nut;

(4) matching the locating slot 1-1 of the top hopper 1 with the locating ring 2-1 of the top limiting lantern ring 2, filling the cylindrical main mould with the MSW sample layer by layer through the top hopper 1 (to avoid spilling the MSW sample), and compacting each layer; wherein: because the cylindrical main mould is radially constrained in the four positions, radial displacement will not occur during compacting, thereby ensuring the radial size of the MSW sample; because both the top and bottom ends of the cylindrical main mould are axially constrained, axial displacement will not occur during compacting, thereby ensuring the axial size of the MSW sample;

(5) after filling and compacting are completed, removing the top hopper 1, screwing off the nut on each screw 3, removing the damping ring on each screw 3, removing the top limiting lantern ring 2, and arranging the second porous stone on the top end of the cylindrical main mould; repeating the step (3) and retaining the MSW sample;

(6) after retaining the MSW sample for a specified duration, screwing off the nut on each screw 3, and removing the damping ring on each screw 3; subsequently, removing the top limiting lantern ring 2, removing the cylindrical main mould with the MSW sample and the two porous stones 4 from the bottom lantern ring 8, swinging the two porous stones 4 at the two ends of the cylindrical main mould back and forth around a central axis several times, and then removing the two porous stones 4 while preventing the MSW sample from being taken away by the porous stones 4; screwing off the bolts on the two steel clamps 6 and removing the two steel clamps 6; finally, removing the two curved steel pieces 5 toward the two ends of the cylindrical main mould (to prevent the MSW sample from being damaged due to an effect of a radial force and preventing the MSW sample from being brought by the curved steel pieces 5), thereby completing preparation of the MSW sample.

What is claimed is:

1. A sample preparation mould for a triaxial test of municipal solid waste (MSW), comprising two porous stones, a cylindrical mould, a bottom lantern ring, a top hopper, a top limiting lantern ring, four screws, and two steel clamps, wherein: the cylindrical mould comprises two curved steel pieces, and the two curved steel pieces are connected with each other; two caps are integrated on an outer wall of each curved steel piece, and the two caps uniformly partition each curved steel piece into three sections along an axial direction; one steel clamp is arranged on every two caps, which are axially symmetrical on the two curved steel pieces; each steel clamp is fixed through bolts; center holes of the top limiting lantern ring and the bottom lantern ring comprise a small-diameter section and a large-diameter section; for the bottom lantern ring, the small-diameter section is below the large-diameter section; a first porous stone of the two porous stones is arranged in the large-diameter section of the bottom lantern ring; the first porous stone fits the large-diameter section of the bottom lantern ring in a clearance fit; a bottom end of the cylindrical mould is embedded into the large-diameter section of the bottom lantern ring and arranged on the first porous stone; an outer wall of the bottom end of the cylindrical mould fits the large-diameter section of the bottom lantern ring in a clearance fit; a second porous stone of the two porous stones is arranged on a top end of the cylindrical mould; for the top limiting lantern ring, the large-diameter section is below the small-diameter section; the top end of the cylindrical mould is embedded into the large-diameter section of the top limiting lantern ring; both of an outer wall of the top end of the cylindrical mould and the second porous stone on the top end of the cylindrical mould fit the large-diameter section of the top limiting lantern ring in a clearance fit; the bottom lantern ring is fixed with the four screws, which are uniformly distributed along a circumferential direction; four locating slots are provided on the top limiting lantern ring and uniformly distributed along a circumferential direction; a top end of each screw passes through one locating slot and is connected to a nut; the top limiting lantern ring presses the second porous stone on the top end of the cylindrical mould; a damping ring is arranged between the top limiting lantern ring and each nut; a locating ring is integrated on a top surface of the top limiting lantern ring at an outside edge of the center hole and coaxially arranged; and a locating slot that matches with the locating ring is provided at a bottom end face of the top hopper, so as to detachably connect the top hopper to the top limiting lantern ring.

2. The sample preparation mould, as recited in claim 1, wherein: each steel clamp comprises two semi-circular steel pieces; through-holes are provided at two ends of a first semi-circular steel piece; threaded holes are provided at two ends of a second semi-circular steel piece; one threaded hole and one through-hole at the same end of the two semi-circular steel pieces are connected through one bolt; and a damping ring is arranged between a head of each bolt and the opposite semi-circular steel piece.

3. A sample preparation method for a triaxial test of MSW using the sample preparation mould as recited in claim 1, comprising steps of:
   (1) screwing off the nut on each screw, removing the damping ring on each screw, and removing the top limiting lantern ring and the second porous stone on the top end of the cylindrical mould;
   (2) placing the bottom lantern ring on level ground, verifying the bolts on the two steel clamps to ensure that the bolts are screwed down, and verifying top end faces of the two curved steel pieces to ensure that the top end faces of the two curved steel pieces are aligned;
   (3) sleeving the large-diameter section of the top limiting lantern ring outside the cylindrical mould, matching the four locating slots of the top limiting lantern ring with the corresponding screws, arranging the damping ring on each of the four screws, and screwing down each nut;
   (4) matching the locating slot of the top hopper with the locating ring of the top limiting lantern ring, filling the cylindrical mould with a MSW sample layer by layer through the top hopper, and compacting each layer;
   (5) after filling and compacting are completed, removing the top hopper, screwing off the nut on each screw, and removing the damping ring on each screw; subsequently, removing the top limiting lantern ring, and arranging the second porous stone on the top end of the cylindrical mould; repeating the step (3) and retaining the MSW sample;
   (6) after retaining the MSW sample for a specified duration, screwing off the nut on each screw, and removing the damping ring on each screw; subsequently, removing the top limiting lantern ring, and removing the cylindrical mould with the MSW sample and the two porous stones from the bottom lantern ring; swinging the two porous stones at the two ends of the cylindrical mould back and forth around a central axis several times and then removing the two porous stones while preventing the MSW sample from being taken away by the porous stones; screwing off the bolts on the two steel clamps and then removing the two steel clamps; finally, removing the two curved steel pieces toward the two ends of the cylindrical mould, thereby completing preparation of the MSW sample.

* * * * *